US012637396B1

(12) United States Patent
Duque et al.

(10) Patent No.: US 12,637,396 B1
(45) Date of Patent: May 26, 2026

(54) EXPLOSIVES USING THERMALLY EXPANDABLE MICROSPHERES IN A SOLID MATRIX

(71) Applicant: Triad National Security, LLC, Los Alamos, NM (US)

(72) Inventors: Amanda Lynn Duque, Los Alamos, NM (US); William Lee Perry, Los Alamos, NM (US); Bryce Tappan, Santa Fe, NM (US)

(73) Assignee: Triad National Security, LLC, Los Alamos, NM (US)

( * ) Notice: Subject to any disclaimer, the term of this patent is extended or adjusted under 35 U.S.C. 154(b) by 1024 days.

(21) Appl. No.: 17/215,351

(22) Filed: Mar. 29, 2021

Related U.S. Application Data

(60) Provisional application No. 63/002,119, filed on Mar. 30, 2020.

(51) Int. Cl.
| | |
|---|---|
| *C06B 45/10* | (2006.01) |
| *B01J 13/04* | (2006.01) |
| *C06B 21/00* | (2006.01) |
| *C06B 23/00* | (2006.01) |
| *C06C 7/00* | (2006.01) |

(52) U.S. Cl.
CPC ............. *C06B 45/105* (2013.01); *B01J 13/04* (2013.01); *C06B 21/0058* (2013.01); *C06B 23/003* (2013.01); *C06C 7/00* (2013.01)

(58) Field of Classification Search
None
See application file for complete search history.

(56) References Cited

U.S. PATENT DOCUMENTS

| | | | | |
|---|---|---|---|---|
| 4,523,122 | A * | 6/1985 | Tone ...................... | G10K 11/02 73/644 |
| 4,547,234 | A * | 10/1985 | Takeuchi .............. | C06B 23/003 149/3 |
| 2011/0083776 | A1* | 4/2011 | Daoud ................... | C06B 45/10 149/12 |

* cited by examiner

*Primary Examiner* — Aileen B Felton
(74) *Attorney, Agent, or Firm* — LeonardPatel PC; Michael A. Leonard, II; Sheetal S. Patel

(57) ABSTRACT

Explosives using thermally expandable microspheres (TEMs) in a solid matrix are disclosed that facilitate tunable changes in local density, porosity, and ultimately, shock sensitivity. Solid high explosive systems with "on demand" shock sensitivity may be created. A relatively small fraction (e.g., 1% or less) of TEMs may incorporated during the manufacturing process of the solid matrix explosive (e.g., polymer-bonded explosives (PBX), trinitrotoluene (TNT), etc.). The fraction of TEMs used to achieve the desired explosive properties will depend on the base explosive material to achieve the desired initiation sensitivity.

20 Claims, 14 Drawing Sheets

300

400

500

700

RT before heat

RT after heat

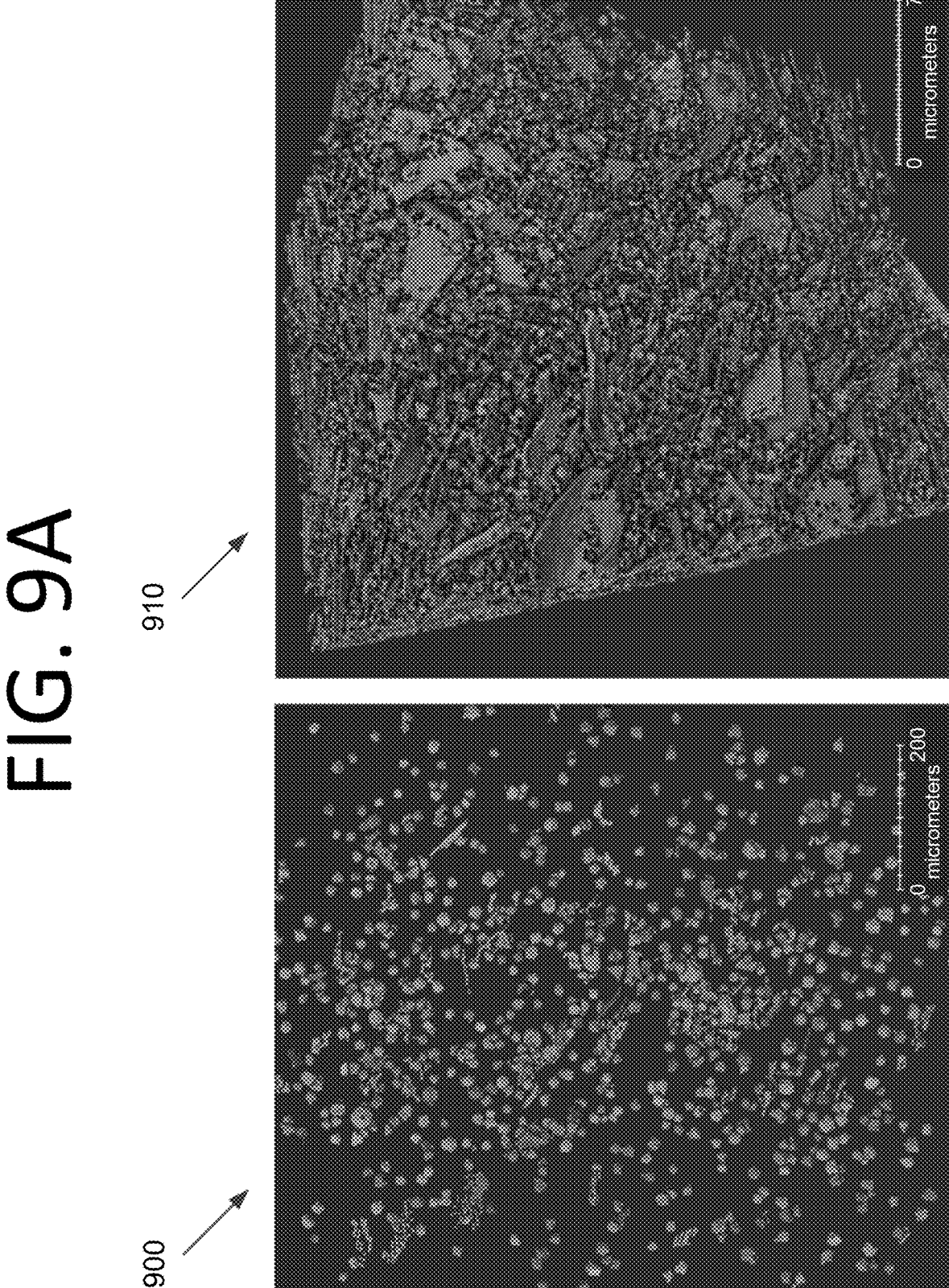

1000

1100

1200

EXPLOSIVES USING THERMALLY EXPANDABLE MICROSPHERES IN A SOLID MATRIX

CROSS-REFERENCE TO RELATED APPLICATION

This application claims the benefit of U.S. Provisional Patent Application No. 63/002,119 filed Mar. 30, 2020. The subject matter of this earlier-filed application is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to explosives, and more specifically, to explosives using thermally expandable microspheres (TEMs) in a solid matrix.

BACKGROUND

For many applications, it has been a long-standing and challenging goal to alter the properties of an explosive or explosive composite "on-command." The creation of voids is a known mechanism of "hot spot" formation in shock initiation due to rapid, adiabatic shock compression of gas filled pores/voids. This then causes localized temperature spikes and decomposition of energetic material. A greater number of available hot spot sites will result in increased shock sensitivity.

Thermally expandable microspheres (TEMs) typically consist of a thermoplastic acrylonitrile shell (10-50 micrometer ($\mu$m) diameter), which encapsulates an inert low boiling hydrocarbon. Upon heating, the TEMs expand as the shell softens while the hydrocarbon gasifies, increasing the internal pressure and expanding the particle by as much as 120% of its initial volume. See TEM response 100 of FIG. 1. TEMs are commercially available, such as under the trade name Expancel®, and are used in a wide variety of industrial applications including thermoplastics, roof coatings, food packaging, lightweight foams, paint, and printing inks, among others.

In FIG. 1, a small thermoplastic sphere encapsulates a hydrocarbon. When a minimum temperature is reached, the particle begins to expand as the thermoplastic shell softens ($T_g$) and the encapsulated hydrocarbon gasifies. The temperature range in which expansion occurs, as well as the starting and ending particle sizes, may be tuned by changing the physical properties of the outer polymer shell and the core hydrocarbon.

Currently, TEMs are used as a sensitizing agent for ammonium nitrate (AN)-based explosives in mining applications. The pre-expanded form (i.e., TEMs that have been heated and expanded before addition to the explosive) is used to increase sensitivity in ammonium nitrate emulsions, while the unexpanded form is used as a sensitizer in the production of AN prills. Typically, the addition of TEMs in slurry explosives range from 0.1 to 0.6% by weight, depending on the desired density and sensitivity of the finished products and the type of TEM that is used.

It has been investigated how the shock sensitivity of homogeneous nitromethane increases upon addition of glass beads and glass microballoons. Nitromethane is a polar liquid. Because these particles act as heterogeneous voids within the explosive matrix, they create hot spots and were found to significantly increase the observed shock sensitivity.

However, TEMs have not been used to alter the shock sensitivity of a polymer-bonded explosive (PBX) by targeting an inert polymeric component of the formulation, on command, while utilizing explosive molecules that are already weapons qualified. Indeed, TEMs have not been used in solid matrix explosives at all. Accordingly, improved solid matrix explosives incorporating TEMs may be beneficial.

SUMMARY

Certain embodiments of the present invention may provide solutions to the problems and needs in the art that have not yet been fully identified, appreciated, or solved by conventional explosive technologies. For example, some embodiments pertain to explosives using TEMs in a solid matrix.

In an embodiment, a solid matrix explosive includes a high explosive and TEMs that change local density, porosity, and shock sensitivity when expanded due to thermal stimulus.

In another embodiment, a solid matrix explosive includes a high explosive and TEMs that change local density, porosity, and shock sensitivity when expanded due to thermal stimulus. The high explosive also includes a polymeric binder material that exists in a solid phase at room temperature.

In yet another embodiment, a solid matrix explosive includes a high explosive and TEMs that change local density, porosity, and shock sensitivity when expanded due to thermal stimulus. The solid matrix explosive is part of an explosive train interrupter and located between a detonator and a booster charge such that a gap exists between the solid matrix explosive including the TEMs and both the detonator and the booster charge when the TEMs are in an unexpanded state.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 9A illustrates x-ray CT analysis of 80% PFBA, 1% TEMs in Sylgard before (left) and after (right) in-situ heating to 120° C. for 10 minutes.

Unless otherwise indicated, similar reference characters denote corresponding features consistently throughout the attached drawings.

DETAILED DESCRIPTION OF THE EMBODIMENTS

Figure 1:
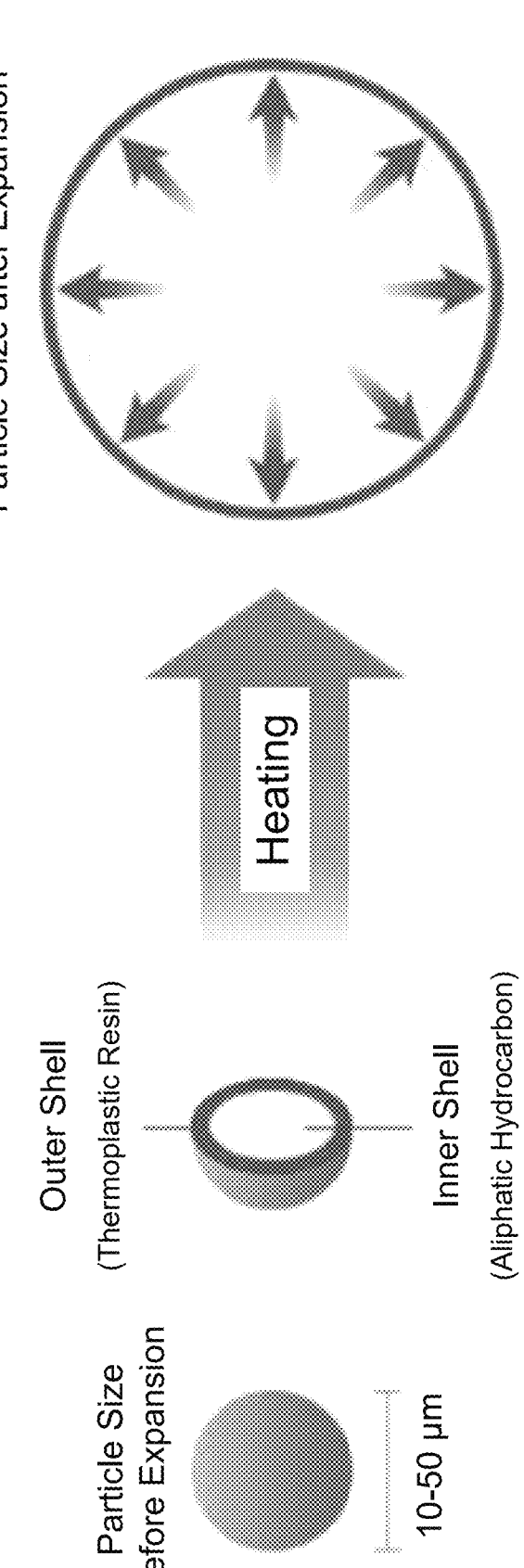
FIG. 1 illustrates the response of a TEM.

Some embodiments pertain to explosives using TEMs in a solid matrix that facilitate tunable changes in local density, porosity, and ultimately, shock sensitivity. As used herein, a "solid matrix" refers to constituents that, when put together, can stand alone and do not require containment. This may be facilitated by the use of a binder material that exists in the solid phase at room temperature. The binder material may be polymeric, monomeric, or melt-castable. For example, the binder may be a non-polymeric substance similar to trini-trotoluene (TNT) or other melt-castable explosives like 2,4-dinitroanisole (DNAN). A binder could also be a mono-mer or oligomer that is not yet polymerized, like many acrylates or methacrylates. Polymerization could be set to occur on heating when the TEMs are expanded. Solid high explosive systems with "on demand" shock sensitivity may be created. As used herein, a "high explosive" is a chemical substance that contains sufficient potential energy to cause an explosion once released. This includes the ability for rapid decomposition to transfer to detonation, which is characterization by formation of a shock wave passing through the material greater than the speed of sound. A relatively small fraction (e.g., 1% or less) of TEMs may be incorporated during the manufacturing process of the solid matrix explosive (e.g., polymer-bonded explosives (PBX), TNT, etc.). However, it should be noted that too large of a fraction of TEMs may reduce the shock sensitivity or even make the material no longer an explosive. The fraction of TEMs used to achieve the desired explosive properties will depend on the base explosive material to achieve the desired initiation sensitivity, and the selection of this fraction is important to the effectiveness of the TEMs in the high explosive. It is expected that a quantity of less than 1 wt % would be optimal for most explosive materials.

After environmental or electromagnetic (EM) thermal stimulus, TEMs in the solid matrix expand and decrease local density. This increases the size and number of voids, which increases shock sensitivity if an appropriate amount of TEMs are used. As such, TEM-based solid matrix explo-sives are safer and less reactive prior to thermal stimulus. Despite these benefits, TEMs have not been used previously with secondary high explosive charges, in more precise output applications to control explosive behavior, or for applications to enhance safety.

For most applications, a significant amount of testing and certification is required to change explosive trains that are already qualified. If changes are made, they are usually small deviations of what is already put into practice. At least in part because the optimal TEM identity, wt %, heating profile, and other factors should be determined for each specific explosive system and intended application, and because the right application of TEMs in solid explosives will likely require a fair amount of research and develop-ment, use of TEMs in solid explosives is not an obvious solution and has not been tried before.

Per the above, including TEMs in solid matrix explosives may make the explosive safer than the explosive alone without TEMs. By incorporating TEMs, it is potentially possible that one could drop the explosive without explod-ing, depending on the nature of the specific explosive or combination of explosives that is used. Additionally or alternatively, TEMs could be used in an explosive train interrupter to improve safety. Where a detonator is used, the detonator can set off a reaction train in the main explosive charge via a higher sensitivity booster charge. Just firing a detonator does not normally start detonation without the booster charge.

Figure 2A:
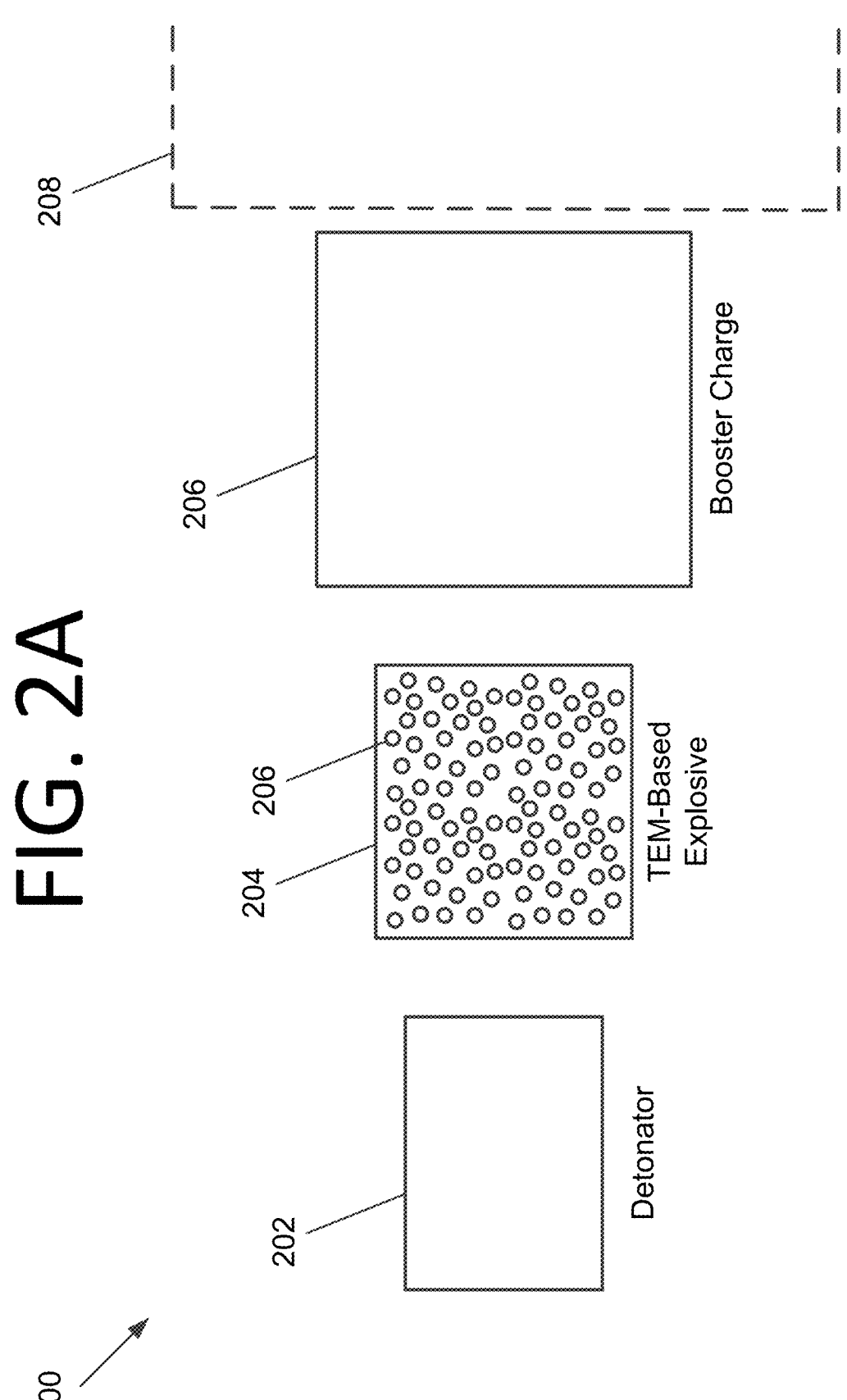
FIG. 2A illustrates an explosive train before TEM expansion, according to an embodiment of the present invention.
Figure 2B:
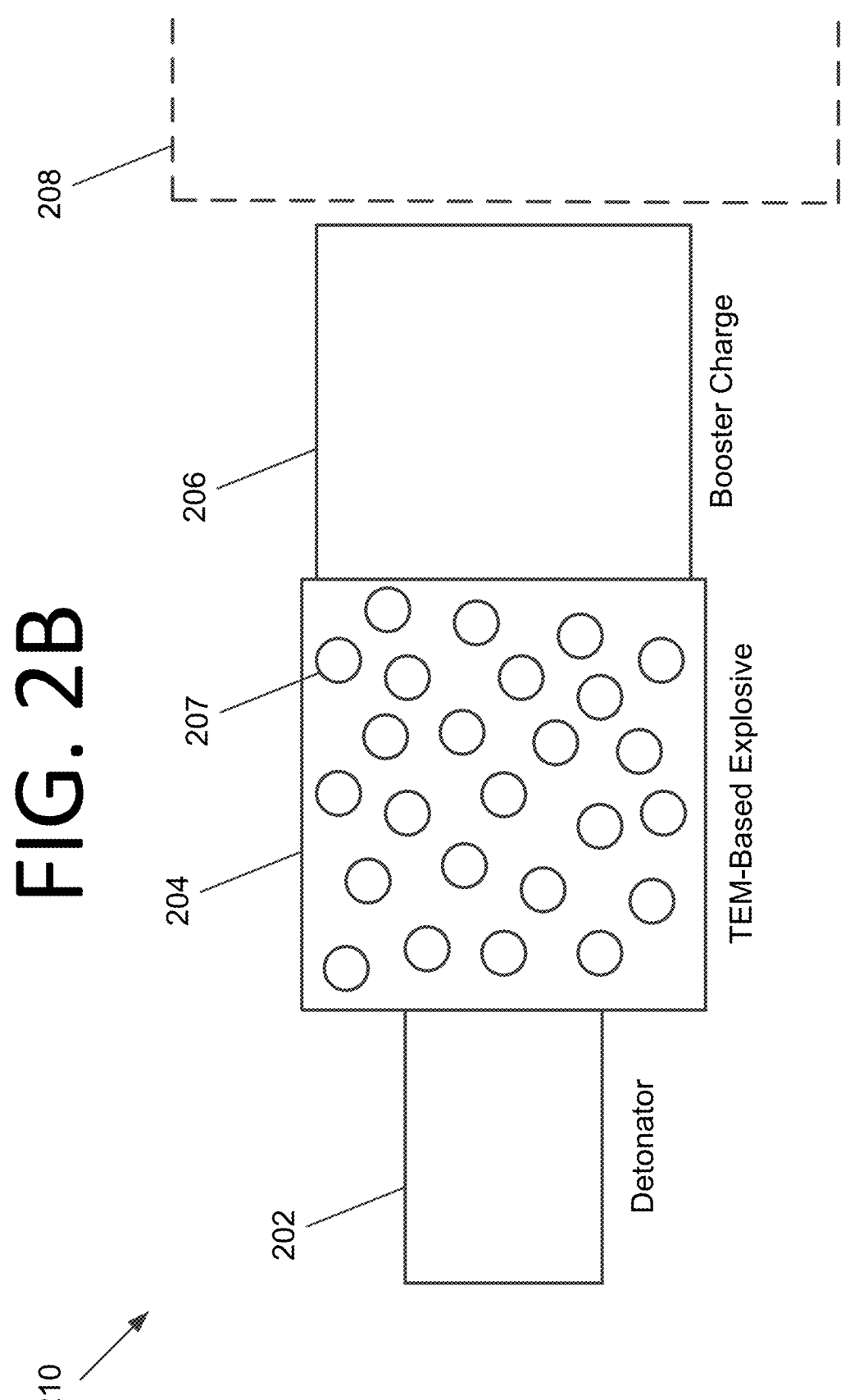
FIG. 2B illustrates the explosive train after TEM expansion, according to an embodiment of the present invention.

However, a TEM formulation could be used in an inter-rupter between the detonator and the booster charge. If a cavity was not filled before expansion, for example, you may not get sufficient shock transfer across an air gap from the detonator to allow for initiation. Such a scenario is shown in FIGS. 2A and 2B both before 200 and after 210 expansion of the TEMs. Before thermal stimulus in FIG. 2A, gaps exist between detonator 202 and TEM-based explosive 204, as well as between TEM-based explosive 204 and booster charge 206. This is because TEM-based explosive 204 is in its smaller volume form with unexpanded TEMs 206. Were detonator 202 to go off, the gap between detonator 202 and TEM-based explosive 204, the gap between TEM-based explosive 204 and booster charge 206, and the lower shock sensitivity of TEM-based explosive 204 interrupts the explosive train. As such, energy is not as effectively trans-mitted from detonator 202 to booster charge 206 via TEM-based explosive 204, and a main charge 208 may not detonate.

However, after thermal stimulus to TEM-based explosive 204 in FIG. 2B, the TEMs expand to an expanded state 207 and TEM-based explosive 204 has increased shock sensi-tivity. This fills in the gaps between the components, and energy can be more effectively transmitted from detonator 202 through TEM-based explosive 204, and on to booster charge 206. As such, once TEM-based explosive 204 is expanded, the explosive system becomes a complete unit can be considered to be in an "armed" state. Such an explosive train interrupter may make bombs and other explosives safer.

Explosive formulations of some embodiments include, but are not limited to, powder explosives held together with polymeric binders that are prepared by pressing or cast-curing and melt-cast explosive systems. Some examples of polymers used in pressed PBX include, but are not limited to, Viton® A, FK-800 (a 3M® product), nitrocellulose and chloroethyl phosphate (CEF, a plasticizer), and Estane® 5703 and a 50/50 wt % eutectic mixture bis(2,2-dinitropro-pyl)-acetal and bis(2,2-dinitropropyl)-formal (BDNPA/F, a plasticizer). Some examples of polymers used in cast-cured PBX include, but are not limited to, hydroxyl terminated polybutadiene (HTPB), cross-linked with multifunctional isocyanates, containing a plasticizer such as dioctyl adipate (DOA), Sylgard® 182, and glycidyl azide polymer (GAP, an energetic polymer), crosslinked with multifunctional isocya-nates. Difunctional isocyanates cure via chain extension. Multifuctional isocyanates can be considered a crosslink. If GAP is cured with a difunctional acrylate, it will be a crosslinking cure. These binders may be combined with any desired powder explosive including, but not limited to, a nitroamine high explosive (HMX or octogen), a nitramide high explosive (RDX or hexogen), triaminotrinitrobenzene (TATB), pentaerythritol tetranitrate (PETN), newly devel-oped explosives, etc., to produce a PBX. Some examples of melt-cast explosives include, but are not limited to, amatols (TNT and ammonium nitrate (AN)), torpex (42% RDX, 40% TNT, 18% aluminum), Pentolite® (50% PETN, 50% TNT), octol (70-75% HMX, 25-30% TNT), and amatol 40 (50% 2,4-dinitroanisole (DNAN), 35% AN, 15% RDX). Indeed, any suitable solid explosive system may be used without deviating from the scope of the invention. While plasticizers may be used in pressed or cast-cured prepara-tions, they are not typically used in melt-cast explosives. In the case of melt-cast explosives, a polymeric binder may not be needed. The explosive material is heated, cast while hot, and then solidifies while cooling.

Experimental Setup

Figure 3:
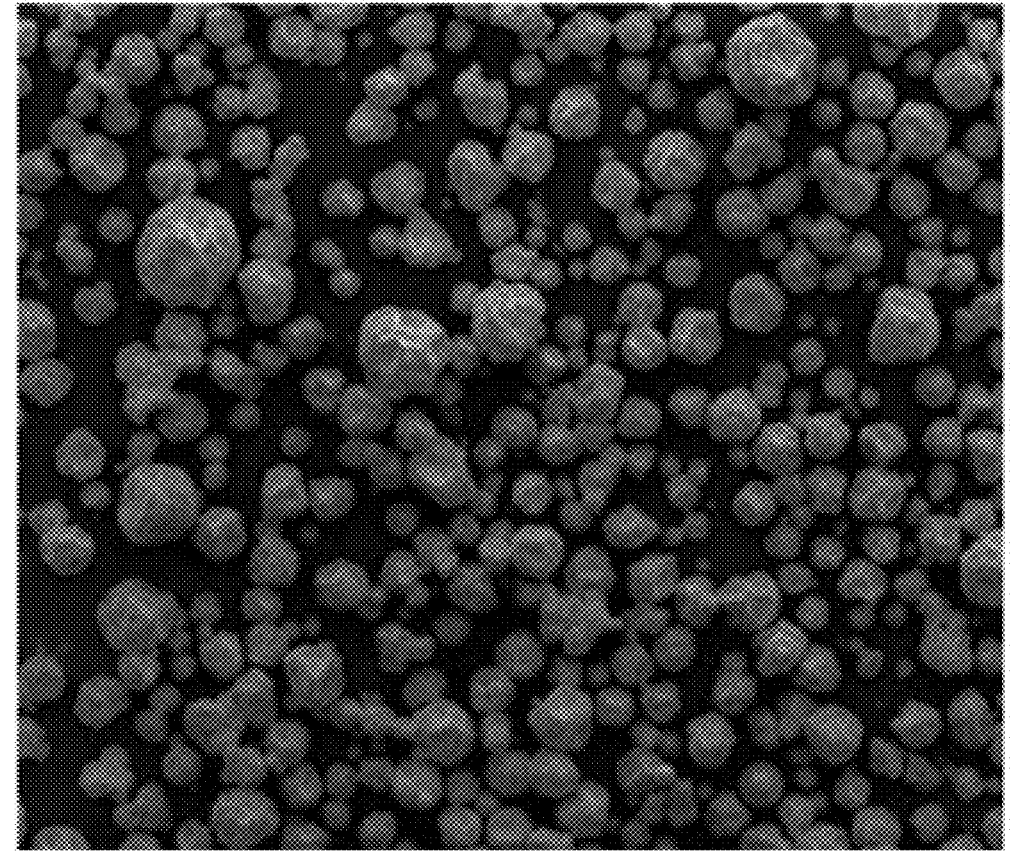
FIG. 3 is a scanning electron microscope (SEM) image illustrating TEMs with average microsphere diameters of approximately 50 $\mu$m, according to an embodiment of the present invention.

TEMs with inert surrogate materials were initially for-mulated and the microstructural details were examined both before and after thermally induced TEM expansion. The formulations were analyzed using scanning electron micros-copy (SEM) and x-ray computed tomography (x-ray CT) under various thermal conditions. There are various types of TEMs that vary in starting size, expansion temperature range, and volume expansion. Initially, Expancel® 930 DU 120 was chosen due to its relatively large starting size (measured to be ~50 μm while the published starting size range is 28-38 μm) to aid in imaging and expansion tracking within the samples. See SEM image 300 of FIG. 3. This size range is likely not ideal for explosive hot spot formation. In subsequent formulations, Expancel® 031 DU 40 (starting diameter ~15 μm) and Expancel® 461 DU 20 (starting diameter ~5-8 μm) were incorporated.

The reported starting temperature for expansion of Expan-cel® 930 DU 120 is 122° C. to 132° C., with the maximum temperature at 192° C. to 207° C. Because heating an actual PBX to near the onset of thermal decomposition is not desirable, the maximum operational temperature was set at 150° C. For these formulations, 5-Iodo-2'-deoxyuridine (IDOX) or pentafluorobenzamide (PFBA) were utilized as the inert surrogate material instead of employing actual high explosives. IDOX and PFBA have been demonstrated as a promising thermomechanical density mock for cyclotetram-ethylene-tetranitramine (HMX).

Surrogate TEM formulations containing IDOX-TEMs-Kel-F or IDOX-TEMs-Estane/BDNPA/F were pressed before heating and analysis. The formulated powder was prepared by a solvent-slurry technique on 5 gram scales. The IDOX and TEMs were suspended in the same solvent that was used to prepare the binder lacquer (Estane/BDNPA in THF and Kel-F in ethyl acetate) in a beaker, and then the lacquer was added to the solvent slurry. The lacquer was typically prepared at a binder concentration of 0.04 g/mL. The mixture was stirred under a stream of air, which slowly evaporated off the solvent until a thick paste was formed.

Once the material resembled a thick paste, the mixture was stirred by hand until it resembled a damp powder that began to flow. The material was then allowed to dry in a fume hood for several hours, followed by 60° C. in a vacuum oven. The range of formulations contained 90-95% IDOX, 4-9% binder, and 1% TEMs. However, any suitable formu-lation may be used without deviating from the scope of the invention. The powder was then pressed at room tempera-ture to a density of approximately 1.68 g/cc.

Surrogate TEM formulations that were cast-cured con-tained TEMs-Sylgard® or PFBA-TEMs-Sylgard® at vary-ing weight percentages, and were initially prepared on ~1 gram scales. Dow Sylgard® 182 silicone elastomer was used in the recommended 10:1 ratio of elastomer to curing agent. The solid components were mixed into the two-part elasto-mer at the predetermined weight percentage and then cast into the desired shape. The material was then cured for a minimum of 2 hours at 60° C.

Pressed Surrogate-Tem Formulations

Figure 4:
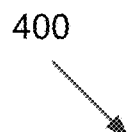
FIG. 4 is a representative SEM image of a pressed PBX surrogate containing 1% TEMs, according to an embodiment of the present invention. The image was taken of a cross-section of a pellet. The microspheres are identified by the arrows.

Pressed surrogate-TEM formulations were analyzed using SEM and x-ray CT both before and after heating. FIG. 4 is a representative SEM image 400 of a pressed PBX surrogate containing 1% TEMs, according to an embodiment of the present invention. In FIG. 4, the sample is 90% IDOX/4.5% Estane/4.5% BDNPA-F/1% TEMs. However, any suitable surrogate or PBX formulation may be used without deviat-ing from the scope of the invention. The image was taken of a cross-section of a pellet. The microspheres are identified by the white arrows.

SEM analysis of this sample showed very similar features of the sample both before and after heating. In both cases, it was evident that the TEMs were present homogeneously throughout the entire sample, did not appear to be damaged, and were completely surrounded by the IDOX crystals in almost all cases.

Figure 5:
FIG. 5 illustrates x-ray CT images and void analysis of the pressed formulation containing 1% TEMs before (left) and after (right) in-situ heating to 150° C. for several hours, according to an embodiment of the present invention.

X-ray CT images were collected of a pressed formulation of 95% IDOX/2% Estane/2% BDNPA-F/1% TEMs. The samples were heated in-situ inside of a load cell fixture up to 150° C. for several hours while the images were collected. Representative slices before heating (left) and after heating (right) and the 3-D void analysis (pixel size of 3.4 μm) are shown in FIG. 5. In FIG. 5, "RT" stands for room tempera-ture. It was found that the mean equivalent diameter of the voids (~32 μm) and the void fraction (2.0%) were not statistically different before and after heating.

Cast-Cured Surrogate-TEM Formulations

Cast-cured formulations will not experience the force applied during pressing. Furthermore, the binders are typi-cally used in a higher weight ratio and tend to be softer than binders used in pressed formulations. These factors should promote TEM expansion within the solid matrix. Testing began with a "test case" system of 10 wt % TEMs loaded in Sylgard®. Formulations that gradually increase the wt % loading of the surrogate solid material and decrease the wt % loading of TEMs then followed.

Figure 6:
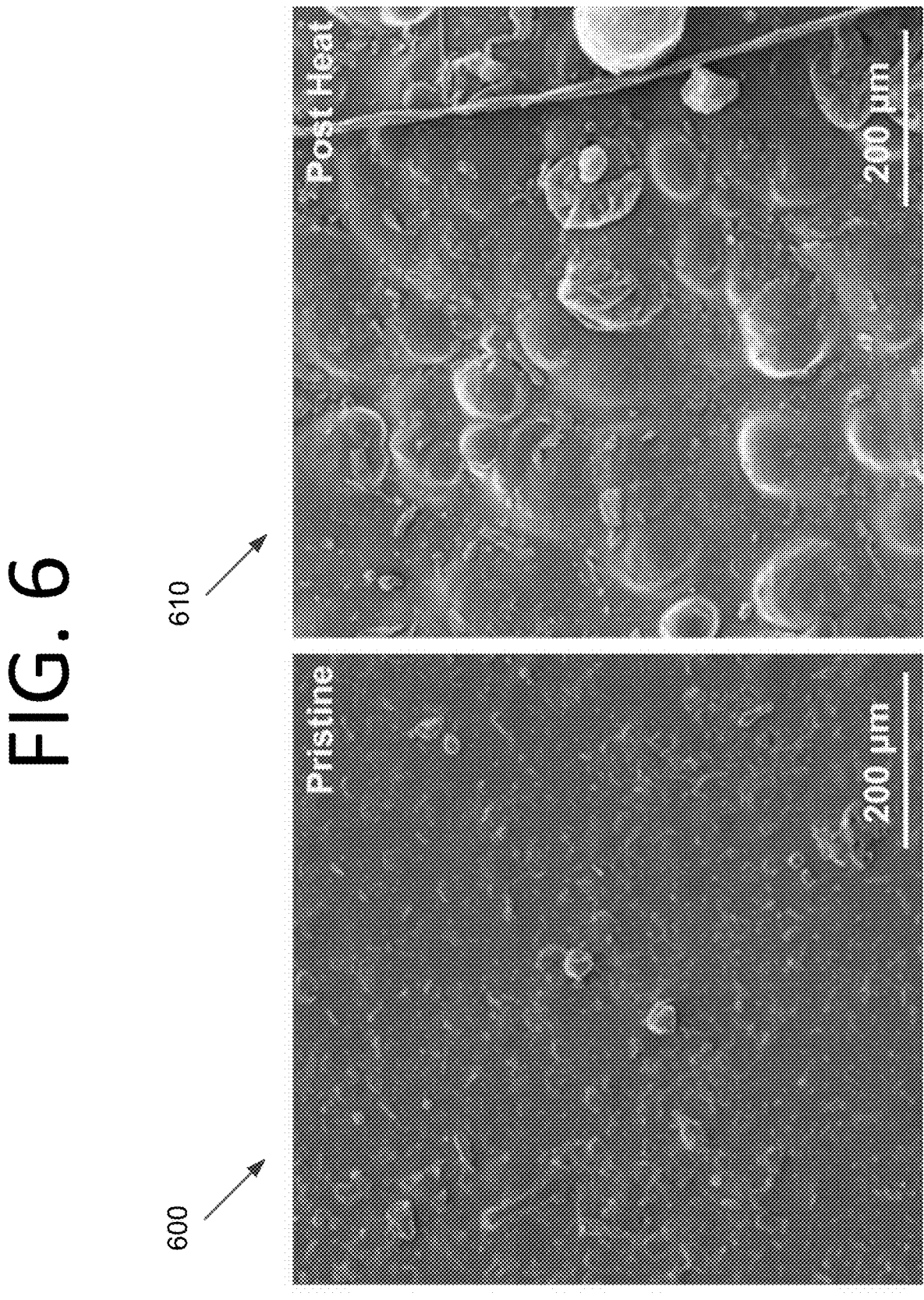
FIG. 6 illustrates SEM images of 10% TEMs in Sylgard® before (left) and after (right) heating to 140° C. for 30 minutes, according to an embodiment of the present invention.
Figure 7:
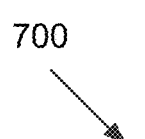
FIG. 7 illustrates x-ray CT analysis of 10% TEMs in Sylgard® before (left) and after (right) in-situ heating to 140° C. for 20 minutes.

The test case system was analyzed using SEM and x-ray CT. Both revealed very clear evidence of TEM expansion within the Sylgard®. See FIGS. 6 and 7. For SEM analysis, the sample was imaged before heating (600), as well as after heating (610) to 140° C. for 30 minutes. In all sample regions that were imaged after heating, TEMs were identified to have expanded to 100-150 μm in diameter. See SEM image 610. X-ray CT of a different section of the same formulation also revealed clear evidence of TEM expansion after in-situ heating to 140° C. for 20 minutes. See images 700 of FIG. 7. The image slices (top) show a clear increase in the void size (indicated by the darker regions). Void size analysis of one section indicates that the average void volume before heating is 0.4%, and increases to 42% after heating. Furthermore, the mean equivalent void diameter increases from ~12 μm to 45 μm after heating.

Beyond the "test case" system described above, the solids loading of the formulation was increased to more closely represent actual PBX material. In this case, the surrogate material PFBA was used in place of actual high explosives (HE) during this developmental, "proof-of-concept" stage in the research. Towards this end, a formulation including 80 wt % PFBA, 1 wt % TEMs in Sylgard® was analyzed. The particle size of the PFBA used was less than 75 μm. This system was analyzed using SEM and x-ray CT. TEM expansion was observed in this system as well.

Figure 8:
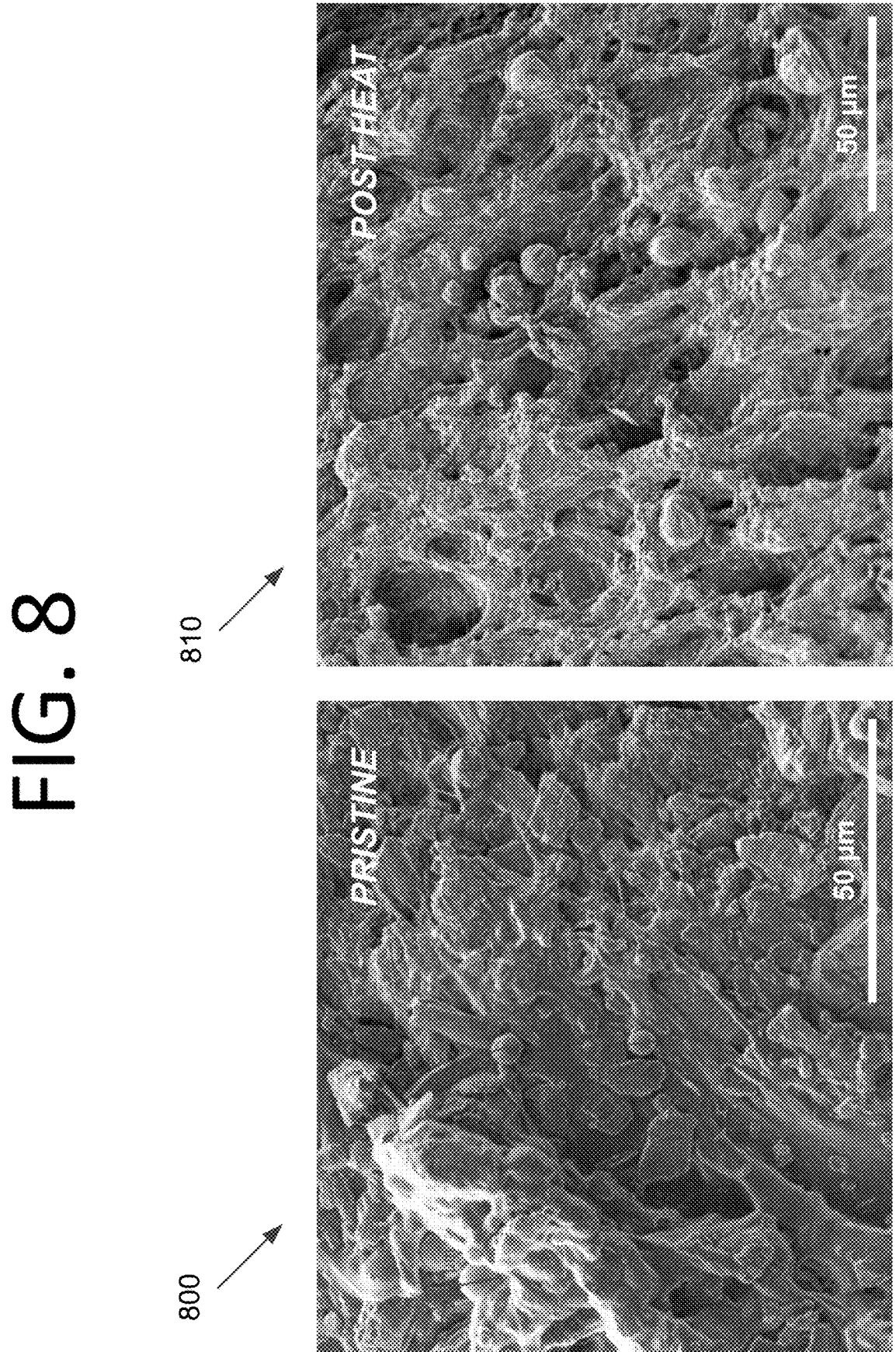
FIG. 8 illustrates SEM images of 80% pentafluorobenz-amide (PFBA), 1% TEMs in Sylgard® before (left) and after (right) heating to 120° C. for 10 minutes, according to an embodiment of the present invention.
Figure 9B:
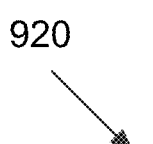
FIG. 9B is a graph comparing pre-heat (15 μm) and post-heat (20 μm) average TEM diameters of the TEMs shown in FIG. 9A, according to an embodiment of the present invention.
Figure 9B:
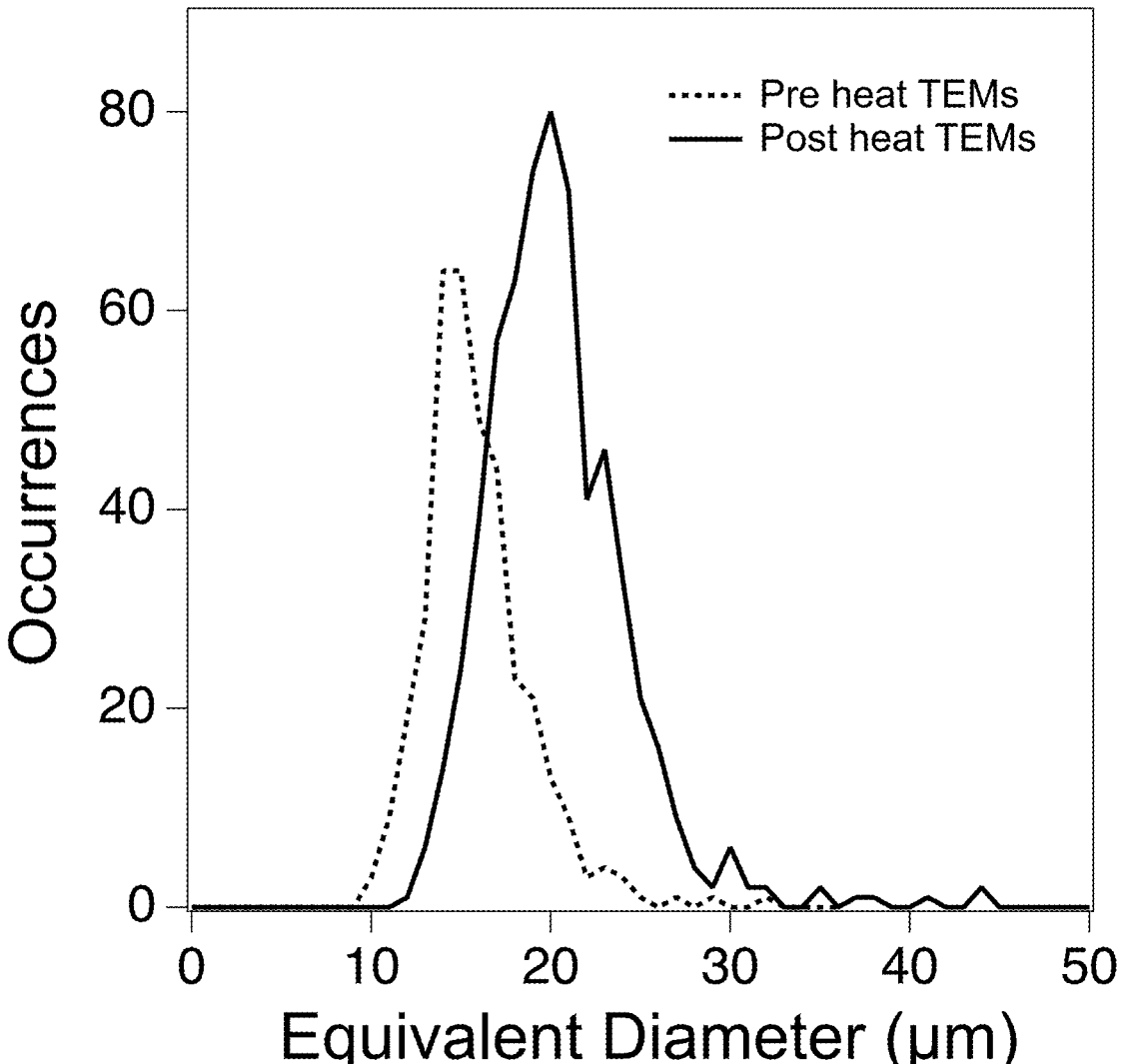

For SEM analysis, the sample was imaged before heating, as well as after heating to 120° C. for 10 minutes. See SEM images 800, 810 of FIG. 8. In all sample regions that were imaged after heating, over 70% of TEMs were identified to have expanded. See image 810. X-ray CT of a different section of the same formulation also revealed evidence of TEM expansion after in-situ heating to 120° C. for 10 minutes. See images 900, 910 of FIG. 9A. The void size analysis of the scanned sample indicates that the average void volume before heating is 0.51% and increases to 4.7% after heating (this includes binder delamination from the crystals). The mean equivalent diameter of the TEMs identified in the sample before and after heating increases from ~15 μm to 20 μm after heating. See graph 920 of FIG. 9B.

Analysis

The primary objective at this stage was to find a surrogate PBX system that allowed for TEM expansion upon heating. Initially, the investigation involved surrogate PBXs prepared using slurry methods (with Kel-F and Estane binder systems), which are consolidated by pressing. Current investigations are underway to determine whether the pressing process potentially damages the TEMs, or whether the "packing force" of the surrounding crystals around the TEMs after pressing prevents expansion from occurring.

Cast-cured formulations will not experience the force applied during pressing. Furthermore, the binders are typically used in a higher weight ratio and tend to be softer than binders used in pressed formulations. These factors should promote TEM expansion within the matrix, and indeed, this was observed to be true in Sylgard®-based formulations.

The potential of expanding microspheres to impart secondary effects in the HE microstructure will also be considered. For example, the microsphere itself may not be the hot spot, but the expansion may cause a shift or rearrangement of the HE crystals that, in turn, have an effect on the initiation properties. Future analysis may include characterization (i.e., ultra-small angle neutron scattering) that can account for this.

The formulation procedure was further improved with methods to reduce the number of air voids present in the sample. For this, resonant acoustic mixing was implemented, which has recently gained favor in the HE formulation community. The LabRAM® unit is a non-contact mixing technology that relies upon the application of a low-frequency acoustic field to facilitate mixing. The unit can be applied to a wide range of systems, and with coupling to the integrated vacuum system, has proven to work particularly well for producing uniform dispersions of PBX formulations, even with difficult-to-disperse components. The intensity of the acoustic waves may be adjusted, and thus, the "power level" received by the mix may be tuned over a wide range. Some reports have shown that high shear mixing may damage the initial TEM shape/integrity, and it should be ensured that the techniques do not have a deleterious effect on the TEM integrity. It was found that resonant acoustic mixing under vacuum, or the use of a speed mixer, coupled with curing in molds under pressure, for example, will aid in producing more uniform cast-cure samples with minimal air voids.

Figure 10:
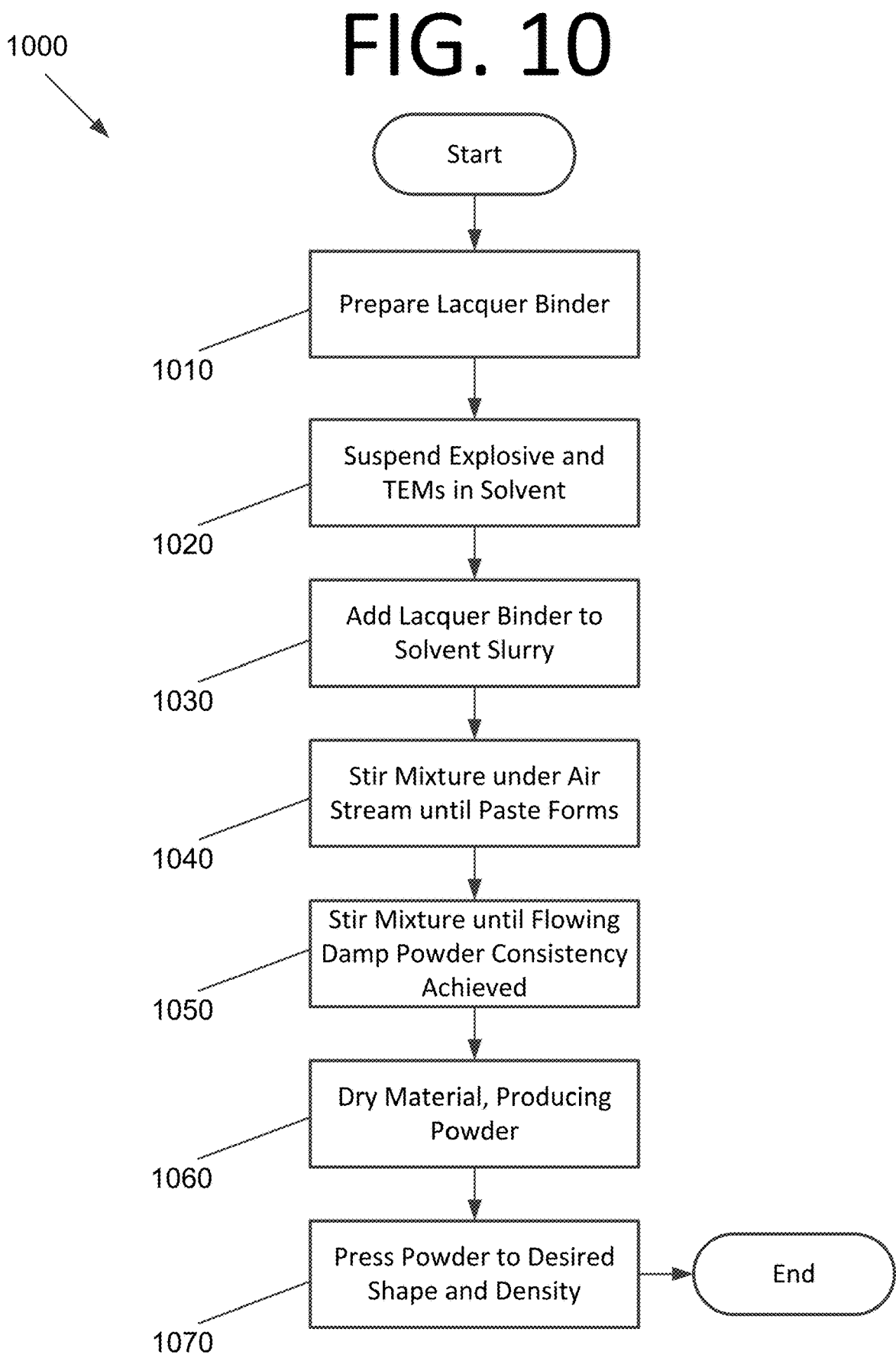
FIG. 10 is a flowchart illustrating a process for producing a pressed solid matrix explosive that includes TEMs, according to an embodiment of the present invention.

FIG. 10 is a flowchart illustrating a process 1000 for producing a pressed solid matrix explosive that includes TEMs, according to an embodiment of the present invention. The process begins with preparing a lacquer binder at 1010. In some embodiments, the lacquer binder includes Viton® A, FK-800, nitrocellulose and chloroethyl phosphate (CEF, a plasticizer), Estane® 5703 and a 50/50 wt % eutectic mixture bis(2,2-dinitropropyl)-acetal and bis(2,2-dinitropropyl)-formal (BDNPA/F, a plasticizer), a combination thereof, etc. A powder explosive and TEMs are suspended in a solvent at 1020. Some suitable solvents may include, but are not limited to, tetrahydrofuran, ethyl acetate, acetone, hexane, chloroform, a combination thereof, etc. In some embodiments, the powder explosive includes HMX, RDX, TATB, PETN, newly developed explosives, a combination thereof, etc. In certain embodiments, the explosive and the TEMs are suspended in the same solvent used to prepare a lacquer binder.

The lacquer is added to the solvent slurry at 1030 and the mixture is stirred under a stream of air to evaporate off the solvent until a paste of a desired thickness forms at 1040. Once the material resembles a paste, the mixture is stirred (e.g., by hand) at 1050 until the mixture resembles a damp powder consistency that begins to flow. The material is then dried at 1060 (e.g., in a fume hood followed by drying in a vacuum oven at a temperature below the temperature at which the TEMs expand). The powder is then pressed to a desired shape and density at 1070.

Figure 11:
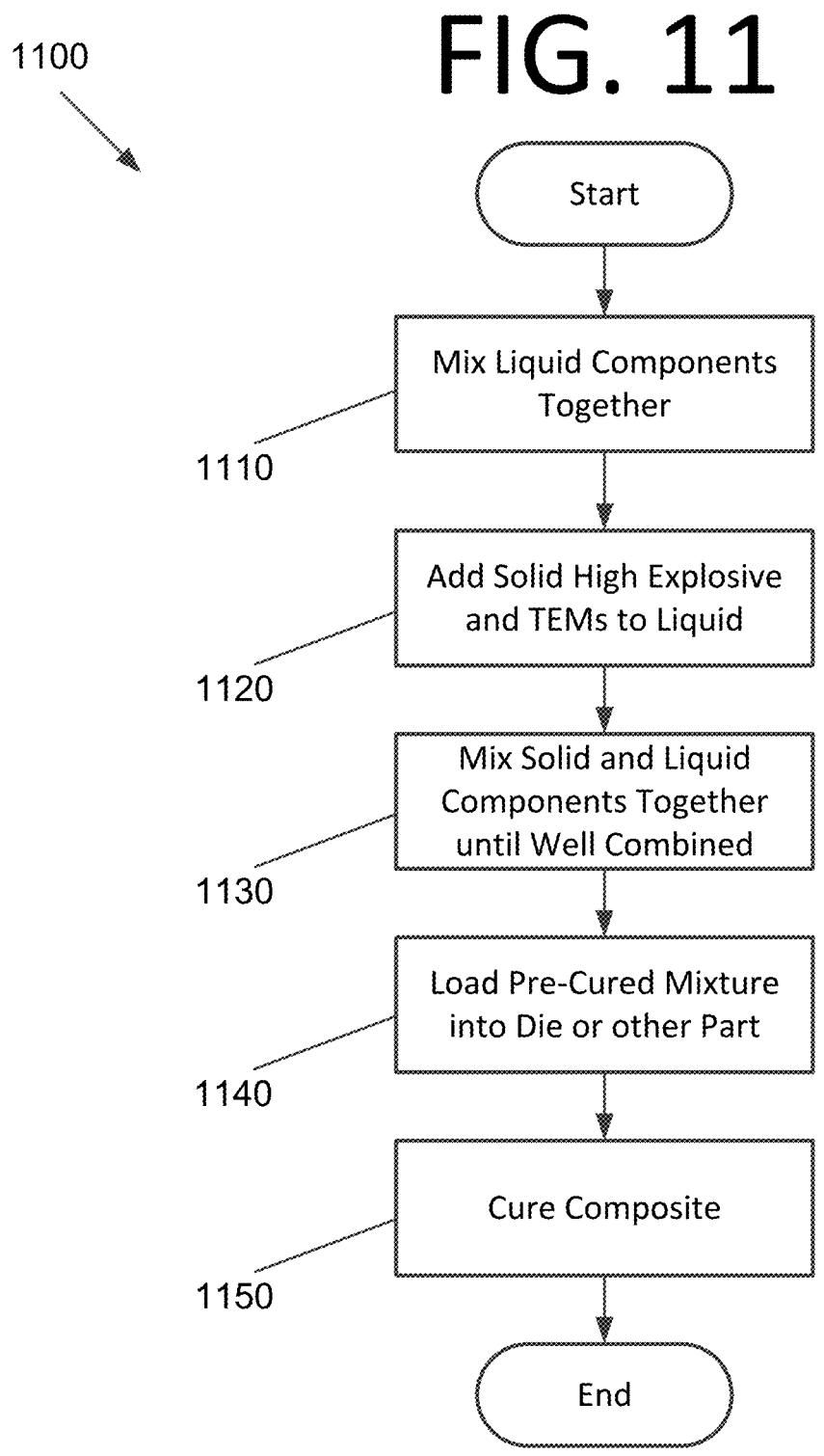
FIG. 11 is a flowchart illustrating a process for producing a cast-cured solid matrix explosive that includes TEMs, according to an embodiment of the present invention.

FIG. 11 is a flowchart illustrating a process 1100 for producing a cast-cured solid matrix explosive that includes TEMs, according to an embodiment of the present invention. The process begins with mixing liquid components together at 1110 (e.g., monomer or pre-polymer, polymer, cross-linker, plasticizer, etc.). This may be done by hand, using a speed mixer, using an acoustic mixer, or any combination thereof. The solid HE and TEMs are then added to the liquid components at 1120, and everything is mixed together until well combined at 1130. This may be accomplished using a speed mixer, using an acoustic mixer, or a combination thereof, for example. The pre-cured mixture is then loaded into a die or another part that will hold the mixture for curing at 1140. The composite is then cured at 1150, producing cast-cured PBX.

Some examples of polymers used in cast-cured PBX include, but are not limited to, hydroxyl terminated polybutadiene (HTPB), cross-linked with multifunctional isocyanates, containing a plasticizer such as dioctyl adipate (DOA), Sylgard® 182, and glycidyl azide polymer (GAP, an energetic polymer), crosslinked with multifunctional isocyanates. Monomers or oligomers that are not yet polymerized may be included in some embodiments, such as many acrylates or methacrylates. These binders may be combined with any desired powder explosive including, but not limited to, HMX, RDX, TATB, PETN, newly developed explosives, etc., to produce a PBX. In some embodiments, the composite is cured under pressure to reduce or eliminate air voids. Curing may occur at room temperature or an elevated temperature, depending on the polymeric binder system that is being used.

Figure 12:
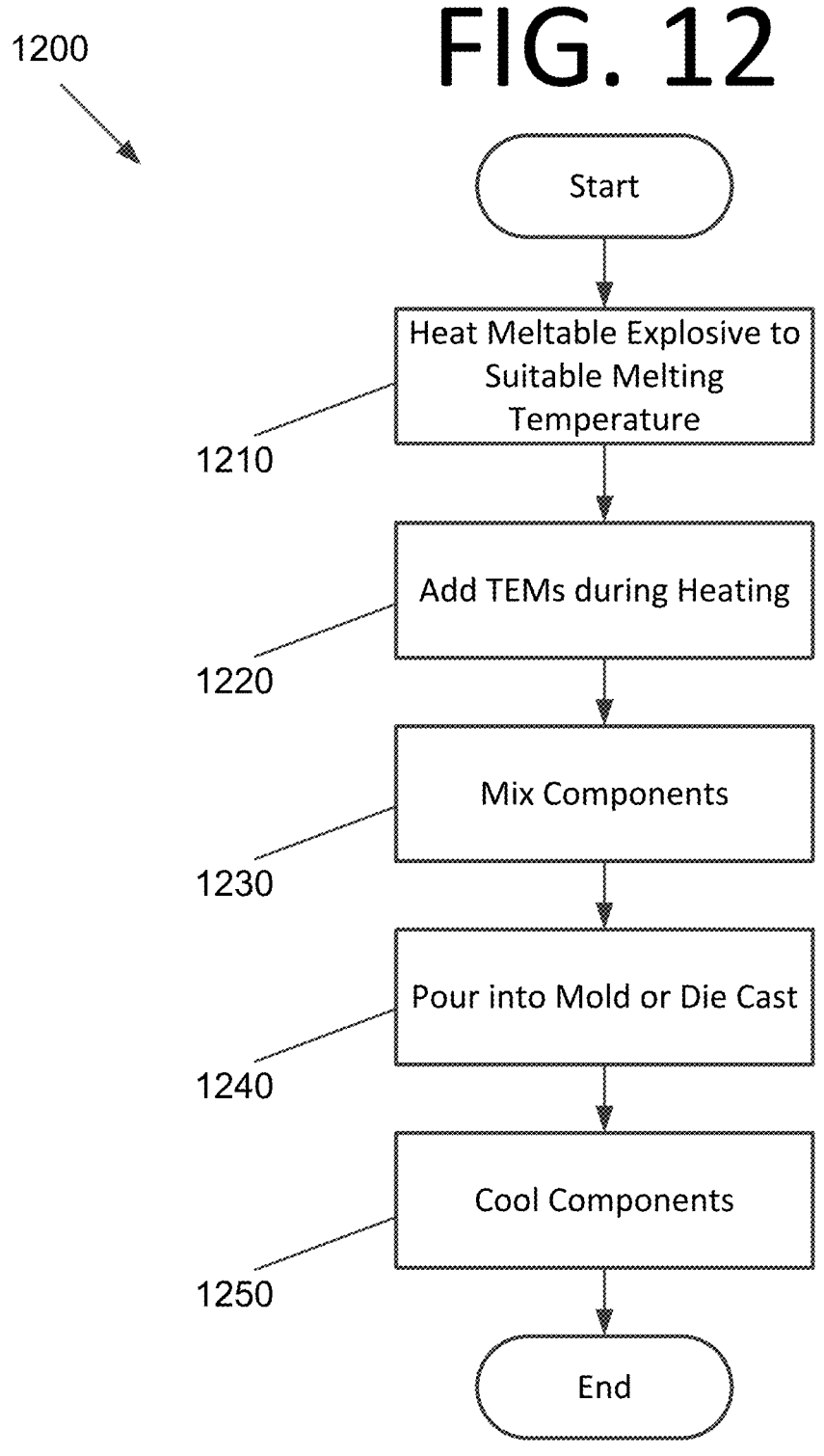
FIG. 12 is a flowchart illustrating a process for producing a melt-cast solid matrix explosive that includes TEMs, according to an embodiment of the present invention.

FIG. 12 is a flowchart illustrating a process 1200 for producing a melt-cast solid matrix explosive that includes TEMs, according to an embodiment of the present invention. The process begins with heating a meltable HE at 1210 to a temperature that allows complete melting to occur, but not high enough such that the TEMs expand. This temperature will depend on the exact system being prepared. While still being heated, any additional solid components, including TEMs, are added to the melted explosive at 1220. The components are well mixed at 1230 and then poured into a mold or die cast at 1240 to obtain the desired shape. The composite is then cooled at 1250, forming the final solid explosive. Some examples of melt-cast explosives include, but are not limited to, amatols (TNT and ammonium nitrate (AN)), torpex (42% RDX, 40% TNT, 18% aluminum), Pentolite® (50% PETN, 50% TNT), octol (70-75% HMX, 25-30% TNT), and amatol 40 (50% 2,4-dinitroanisole (DNAN), 35% AN, 15% RDX).

SUMMARY

Both experimental and numerical analysis suggest that TEM expansion within a solid explosive, such as PBX, is a viable technique to impart microstructural changes that have a measurable, on-demand effect on the initiation sensitivity. Although initial pressed samples did not appear to facilitate measurable TEM expansion, the observations in cast-cured systems are encouraging, and further refinements should achieve similar results in pressed systems. Surrogate-TEM cast-cured formulations will continue to be prepared with high solids loading in different binder systems, as well as reinvestigation of other pressed preparations. Future work includes development of PBX-TEM formulations with various high explosives and shock initiation experiments with TEMs of smaller starting diameters.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

In an embodiment, a solid matrix explosive includes a high explosive and TEMs that change local density, porosity, and shock sensitivity when expanded due to thermal stimulus. In some embodiments, the solid matrix explosive further comprises a polymeric binder material that exists in a solid phase at room temperature. In certain embodiments, the TEMs make up a fraction of 1% or less of the solid matrix explosive by weight percent. In some embodiments, the high explosive includes PBX or a melt-cast explosive.

In some embodiments where a polymer is used, the polymer(s) include a fluoroelastomer, nitrocellulose and CEF, thermoplastic polyurethane with a eutectic mixture bis(2,2-dinitropropyl)-acetal and BDNPA/F, or a combination thereof. In certain embodiments, the polymer(s) include HTPB cross-linked with multifunctional isocyanates containing a plasticizer, a silicone elastomer, GAP crosslinked with multifunctional isocyanates, or any combination thereof. In some embodiments, monomers or oligomers that are not yet polymerized may be included, such as many acrylates or methacrylates. In some embodiments, these binders are combined with HMX, RDX, TATB, PETN, newly developed explosives, or a combination thereof. In certain embodiments, the high explosive includes an amatol, torpex, octol, or any combination thereof.

In another embodiment, an explosive train interrupter includes a detonator, a booster charge, and a solid matrix explosive including TEMs located between the detonator and the booster charge such that a gap exists between the solid matrix explosive including the TEMs and both the detonator and the booster charge when the TEMs are in an unexpanded state. The booster charge may be proximate to a main charge.

In yet another embodiment, a method for producing a pressed solid matrix explosive that includes TEMs includes preparing a lacquer binder and suspending a powder explosive and the TEMs in a solvent. The method also includes adding lacquer to the solvent slurry to form a mixture and stirring the mixture under a stream of air to evaporate off the solvent until a paste mixture forms. The method further includes stirring the paste mixture until the mixture resembles a damp powder consistency that begins to flow, drying the damp powder mixture into a dry powder, and pressing the dry powder.

In still another embodiment, a method for producing a cast-cured solid matrix explosive that includes TEMs includes mixing liquid components together. In some embodiments, the liquid components include a monomer or pre-polymer, a polymer, a cross-linker, a plasticizer, or any combination thereof. The method also includes adding a solid HE and the TEMs to the liquid components and mixing to produce a pre-cured mixture. The method further includes loading the pre-cured mixture into a die or another part that will hold the mixture for curing and curing the mixture, producing cast-cured PBX. In some embodiments, the composite is cured under pressure to reduce or eliminate air voids. In certain embodiments, curing occurs at room temperature or an elevated temperature, depending on the polymeric binder system that is being used.

In another embodiment, a method for producing a melt-cast solid matrix explosive that includes TEMs includes heating a meltable HE to a temperature that allows complete melting to occur, but is not high enough such that the TEMs expand. While the HE is still being heated, the method also includes adding the TEMs to the melted explosive and mixing to produce a composite. The method further includes pouring the composite into a mold or die cast and cooling the composite, forming a solid explosive.

The invention claimed is:

1. A solid matrix explosive, comprising:
a detonator;
a booster charge; and
a high explosive comprising thermally expandable microspheres (TEMs) located between the detonator and the booster charge, the TEMs comprising a thermoplastic shell that encapsulates an inert hydrocarbon, wherein
responsive to a thermal stimulus being applied to the solid matrix explosive, the thermoplastic shell softens and the inert hydrocarbon gasifies to expand the TEMs, increasing shock sensitivity of the solid matrix explosive,
the TEMs, when expanded, complete an explosive train with the detonator and the booster charge, and
the solid matrix explosive is a secondary high explosive charge, the secondary high explosive charge configured to control explosive behavior, enhance safety, or both.

2. The solid matrix explosive of claim 1, wherein the TEMs make up a fraction of 1% or less of the solid matrix explosive by weight percent.

3. The solid matrix explosive of claim 1, wherein the high explosive comprises a polymer-bonded explosive (PBX) or a melt-cast explosive.

4. The solid matrix explosive of claim 1, further comprising:
a polymeric binder material that exists in a solid phase at room temperature.

5. The solid matrix explosive of claim 4, wherein a polymer of the polymeric binder material comprises a fluoroelastomer, nitrocellulose and chloroethyl phosphate (CEF), thermoplastic polyurethane with a eutectic mixture bis(2,2-dinitropropyl)-acetal and bis(2,2-dinitropropyl)-formal (BDNPA/F), or any combination thereof.

6. The solid matrix explosive of claim 4, wherein a polymer of the polymeric binder material comprises hydroxyl terminated polybutadiene (HTPB) cross-linked with multifunctional isocyanates containing a plasticizer, a silicone elastomer, glycidyl azide polymer (GAP) cross-linked with multifunctional isocyanates, or any combination thereof.

7. The solid matrix explosive of claim 4, wherein the binder comprises a monomer or oligomer that is not yet polymerized prior to heating.

8. The solid matrix explosive of claim 4, wherein a polymer of the polymeric binder material is combined with a nitroamine high explosive (HMX), a nitramide high explosive (RDX), triaminotrinitrobenzene (TATB), pentaerythritol tetranitrate (PETN), or any combination thereof.

9. The solid matrix explosive of claim 1, wherein
the solid matrix explosive is an explosive train interrupter such that a gap exists between the solid matrix explosive comprising the TEMs and both the detonator and the booster charge when the TEMs are in an unexpanded state.

10. A solid matrix explosive, comprising:
a detonator;
a booster charge; and
a high explosive located between the detonator and the booster charge and comprising thermally expandable microspheres (TEMs) comprising a thermoplastic shell that encapsulates an inert hydrocarbon and a polymeric binder material that exists in a solid phase at room temperature, wherein
responsive to a thermal stimulus being applied to the solid matrix explosive, the thermoplastic shell softens and the inert hydrocarbon gasifies to expand the TEMs, increasing shock sensitivity of the solid matrix explosive,
the TEMs, when expanded, complete an explosive train with the detonator and the booster charge, and
the solid matrix explosive is a secondary high explosive charge, the secondary high explosive charge configured to control explosive behavior, enhance safety, or both.

11. The solid matrix explosive of claim 10, wherein the TEMs make up a fraction of 1% or less of the solid matrix explosive by weight percent.

12. The solid matrix explosive of claim 10, wherein a polymer of the polymeric binder material comprises a fluoroelastomer, nitrocellulose and chloroethyl phosphate (CEF), thermoplastic polyurethane with a eutectic mixture bis(2,2-dinitropropyl)-acetal and bis(2,2-dinitropropyl)-formal (BDNPA/F), or any combination thereof.

13. The solid matrix explosive of claim 10, wherein a polymer of the polymeric binder material comprises hydroxyl terminated polybutadiene (HTPB) cross-linked with multifunctional isocyanates containing a plasticizer, a silicone elastomer, glycidyl azide polymer (GAP) cross-linked with multifunctional isocyanates, or any combination thereof.

14. The solid matrix explosive of claim 10, wherein a polymer of the polymeric binder material is combined with a nitroamine high explosive (HMX), a nitramide high explosive (RDX), triaminotrinitrobenzene (TATB), pentaerythritol tetranitrate (PETN), or any combination thereof.

15. The solid matrix explosive of claim 10, wherein the solid matrix explosive is an explosive train interrupter such that a gap exists between the solid matrix explosive comprising the TEMs and both the detonator and the booster charge when the TEMs are in an unexpanded state.

16. A solid matrix explosive, comprising:

a detonator;

a booster charge; and a high explosive located between the detonator and the booster charge and comprising thermally expandable microspheres (TEMs), the TEMs comprising a thermoplastic shell that encapsulates an inert hydrocarbon, wherein the TEMs, when expanded, complete an explosive train with the detonator and the booster charge, the TEMs make up a fraction of 1% or less of the solid matrix explosive by weight percent, the solid matrix explosive is an explosive train interrupter such that a gap exists between the solid matrix explosive comprising the TEMs and both the detonator and the booster charge when the TEMs are in an unexpanded state, and responsive to a thermal stimulus being applied to the solid matrix explosive, the thermoplastic shell softens and the inert hydrocarbon gasifies to expand the TEMS, increasing shock sensitivity of the solid matrix explosive.

17. The solid matrix explosive of claim 16, further comprising:

a polymeric binder material that exists in a solid phase at room temperature.

18. The solid matrix explosive of claim 17, wherein a polymer of the polymeric binder material comprises a fluoroelastomer, nitrocellulose and chloroethyl phosphate (CEF), thermoplastic polyurethane with a eutectic mixture bis(2,2-dinitropropyl)-acetal and bis(2,2-dinitropropyl)-formal (BDNPA/F), or any combination thereof.

19. The solid matrix explosive of claim 17, wherein a polymer of the polymeric binder material comprises hydroxyl terminated polybutadiene (HTPB) cross-linked with multifunctional isocyanates containing a plasticizer, a silicone elastomer, glycidyl azide polymer (GAP) cross-linked with multifunctional isocyanates, or any combination thereof.

20. The solid matrix explosive of claim 17, wherein a polymer of the polymeric binder material is combined with a nitroamine high explosive (HMX), a nitramide high explosive (RDX), triaminotrinitrobenzene (TATB), pentaerythritol tetranitrate (PETN), or any combination thereof.

* * * * *